(No Model.)

J. T. WALLACE.
GUARD FOR PLANTS AND TREES.

No. 283,837. Patented Aug. 28, 1883.

Attest:
Cont. A. Cooper.
H. E. Hannmann.

John T. Wallace
Inventor:
By Charles E. Foster
Atty.

N. PETERS, Photo-Lithographer, Washington, D. C.

UNITED STATES PATENT OFFICE.

JOHN T. WALLACE, OF NEOGA, ILLINOIS.

GUARD FOR PLANTS AND TREES.

SPECIFICATION forming part of Letters Patent No. 283,837, dated August 28, 1883.

Application filed April 19, 1883. (No model.)

*To all whom it may concern:*

Be it known that I, JOHN T. WALLACE, of Neoga, Cumberland county, Illinois, have invented certain Improvements in Guards for Plants, &c., of which the following is a specification.

My invention is a guard for trees and plants, constructed as fully described hereinafter, to be easily applied and removed, to effectually protect the tree, and so as to be readily packed for transportation.

Figure 1:
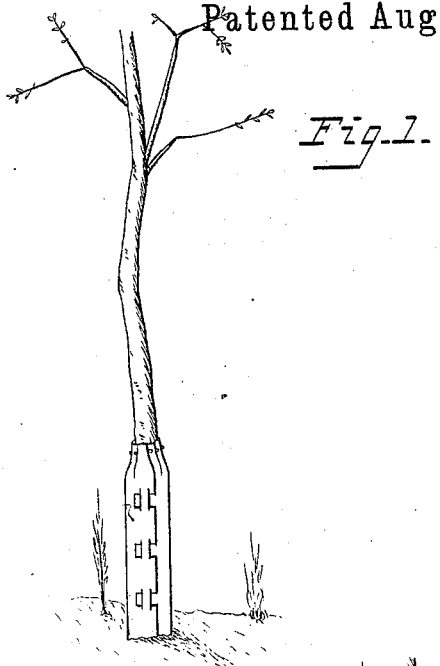
Figure 2:
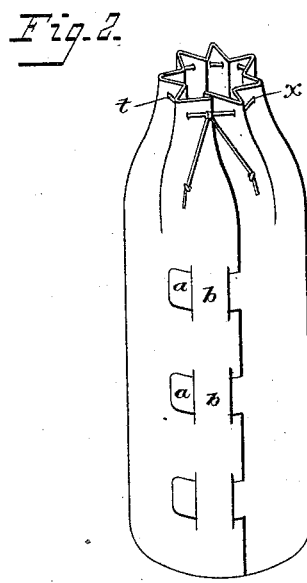
Figure 3:
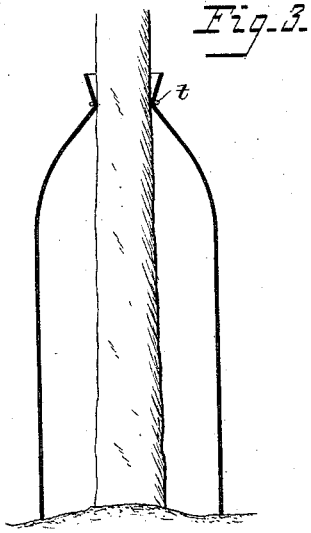
Figure 4:
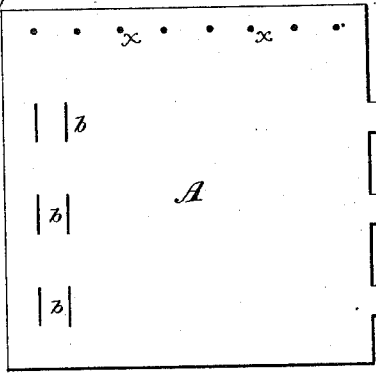

In the drawings, Figure 1 illustrates my improved guard applied to a tree. Fig. 2 is a perspective view of the same detached. Fig. 3 is a section showing the protector applied to the tree, and Fig. 4 is a view showing the form of the blank from which the protector is made.

The guard is made of paper or other fabric saturated with tar, paraffine, carbolic acid, or other material or mixture which may be desirable to deter insects from approaching the plant to be protected. The paper is cut into sheets A of proper size, and each sheet is provided with two or more tongues, *a*, which may be cut of the same piece as the sheet, or may be eyeleted or cemented thereto, and are adapted to slits *b b*, so that after the sheet is folded round the plant or tree the tongues may be passed into the slits and the sheet thereby held to its cylindrical shape, to serve as a guard impenetrable to insects.

It will be apparent that the tongues may be of different forms and differently arranged.

To prevent the descent of insects from the stem to the roots of the plant, the upper edge of the guard is creased and gathered, and has perforations *x* and a cord, *t*, which is wrapped around the contracted end, and by which it may be drawn tightly against the trunk, as shown in Figs. 1 and 3. In this position the guard is in contact with the tree only at one point, near its upper end, so there is no narrow space to harbor insects. The tree can move freely under the action of the wind without breaking the guard or displacing it, and without rubbing the bark. While the guard may thus be made into a closed cylinder, it can be packed into a small compass by untying the cord, removing the tongues from the slits, and flattening the sheet. The device can thus be more easily transported than those which must be carried folded or in a cylindrical shape.

I claim—

1. A tree-guard consisting of a continuous imperforate hollow cylinder of flexible material, open at the lower end, and wrinkled and folded to contract the upper end to make contact with the tree only at the neck or contracted portion, substantially as set forth.

2. The tree-guard consisting of a sheet, A, of flexible imperforate fabric, slitted and provided with tongues *a*, gathered at the upper end, provided with a gathering-cord, *t*, substantially as set forth.

In testimony whereof I have signed my name to this specification in the presence of two subscribing witnesses.

JOHN T. WALLACE.

Witnesses:
JAMES W. SHULL,
HENRY H. REX.